(12) United States Patent
Alve et al.

(10) Patent No.: US 6,988,204 B2
(45) Date of Patent: Jan. 17, 2006

(54) SYSTEM AND METHOD FOR KEY DISTRIBUTION AND NETWORK CONNECTIVITY

(75) Inventors: Jukka Alve, Helsinki (FI); Mauri Kangas, Paimio (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/124,637

(22) Filed: Apr. 16, 2002

(65) Prior Publication Data

US 2003/0196089 A1 Oct. 16, 2003

(51) Int. Cl.
*G06F 11/30* (2006.01)
*H04L 9/00* (2006.01)

(52) U.S. Cl. .................. 713/193; 713/171; 713/172; 380/45; 380/281; 380/282; 380/283

(58) Field of Classification Search ............. 713/171, 713/172, 193; 380/45, 281, 282, 283, 284; 327/545, 546
See application file for complete search history.

(56) References Cited

U.S. PATENT DOCUMENTS

| | | | | |
|---|---|---|---|---|
| 4,969,188 A | * | 11/1990 | Schobi ................... 380/277 |
| 5,142,578 A | | 8/1992 | Matyas et al. |
| 5,201,000 A | * | 4/1993 | Matyas et al. .............. 380/30 |
| 5,265,164 A | | 11/1993 | Matyas et al. |
| 5,715,403 A | | 2/1998 | Stefik |
| 5,721,781 A | | 2/1998 | Deo et al. |
| 5,748,738 A | | 5/1998 | Bisbee et al. |
| 5,812,666 A | | 9/1998 | Baker et al. |
| 5,862,325 A | | 1/1999 | Reed et al. |
| 5,892,900 A | | 4/1999 | Ginter et al. .............. 395/186 |
| 5,999,629 A | * | 12/1999 | Heer et al. ................ 705/51 |
| 6,047,242 A | * | 4/2000 | Benson ..................... 702/35 |
| 6,112,181 A | | 8/2000 | Shear et al. |
| 6,128,391 A | * | 10/2000 | Denno et al. ............. 380/283 |
| 6,185,683 B1 | | 2/2001 | Ginter et al. |
| 6,253,193 B1 | | 6/2001 | Ginter et al. |
| 6,266,299 B1 | | 7/2001 | Oshima et al. |
| 6,351,813 B1 | * | 2/2002 | Mooney et al. ........... 713/185 |
| 6,363,149 B1 | * | 3/2002 | Candelore ................. 380/45 |
| 6,374,354 B1 | * | 4/2002 | Walmsley et al. ......... 713/167 |
| 6,389,403 B1 | | 5/2002 | Dorak, Jr. |
| 6,434,238 B1 | * | 8/2002 | Chaum et al. ............. 380/45 |
| 6,516,412 B2 | * | 2/2003 | Wasilewski et al. ....... 713/168 |
| 6,527,638 B1 | * | 3/2003 | Walker et al. ............. 463/25 |

FOREIGN PATENT DOCUMENTS

| | | |
|---|---|---|
| WO | WO 98/43426 | 10/1998 |
| WO | WO 99/57905 | 11/1999 |

OTHER PUBLICATIONS

SmartRight—Answer to the Call for Proposals for Content Protection & Copy Management Technologies, DVB–CPT–714, Version 1.0, Oct. 19, 2001, cover and pp. 1–53.
U.S. Appl. No. 10/703,454, filed Nov. 10, 2003, Alve.
U.S. Appl. No. 09/982,573, filed Oct. 18, 2001, Alve.
Louis C. Guillou, "Smart Cards and Conditional Access," Lecture Notes In Computer Science, Springer Verlag, pp. 480–489, Apr. 9, 1984.
Menezes et al., "Handbook of Applied Cryptography," CRC Press Series on Discrete Mathematics and Its Applications, pp. 39, 506–508, and 551–552, Boca Raton, Florida, USA, 1997.

(Continued)

*Primary Examiner*—Gilberto Barron
*Assistant Examiner*—Kambiz Zand
(74) *Attorney, Agent, or Firm*—Morgan & Finnegan, L.L.P.

(57) ABSTRACT

Systems and methods for distributing keys of the sort used for purposes including logging onto computer networks, accessing authorized domains, and accessing persistently-protected data. Also discussed is a smart card that offers network connectivity to a media device.

19 Claims, 5 Drawing Sheets

OTHER PUBLICATIONS

Mana et al., "GSM-Ticket:Generic Secure Mobile Ticketing Service," Gemplus World Developers Conference, Paris, France, Jun. 21, 2001.

"Call for Proposals for Content Protection & Copy Management Technologies," DVB Technical Module Sub-Group on Copy Protection Technologies, Revision, 1.2, Jul. 5, 2001.

"XCP Cluster Protocol," IBM Response to DVB-CPT Call for Proposals for Content Protection & Copy Management, Oct. 19, 2001.

European Search Report for EP 03 746374, date of completion of search –Mar. 31, 2005.

* cited by examiner

SYSTEM AND METHOD FOR KEY DISTRIBUTION AND NETWORK CONNECTIVITY

FIELD OF INVENTION

This invention relates to systems and methods for key distribution and network connectivity.

BACKGROUND INFORMATION

In recent years, the use of keys for purposes such as decrypting persistently-protected data has increased. For example, the DVB-CPT (Digital Video Broadcast—Content Protection Technology) body has proposed the concept of an authorized domain. Associated with an authorized domain is data, such as films, music, software, and the like, and a number of devices capable of using the data. Devices associated with the domain would be able to access the data associated with the domain, but devices not associated with the domain could not. In certain embodiments of this proposal, a particular access key are required to access the data associated with a particular authorized domain. Accordingly, only devices associated with a particular authorized domain possess the access key associated with that domain.

Recent years have also brought increased interest in bringing networking capabilities to devices such as general purpose computers, portable devices, media terminals, and the like. Within this context, there has been particular interest in wireless networking using technologies such as IEEE 802.11(b) and Bluetooth.

SUMMARY OF THE INVENTION

Embodiments of the present invention provide systems and methods for distributing keys of the sort used for purposes including logging onto computer networks, accessing authorized domains, and accessing persistently-protected data. Further embodiments provide a smart card that offers wireless network connectivity to a media device.

DETAILED DESCRIPTION OF THE INVENTION

Embodiments of the present invention provide a Key Distribution Card (KDC) that can operate to distribute access keys to media devices such as general purpose and/or personal computers, mobile terminals, fixed terminals, television sets, digital set-top-boxes and personal video recorders. Such access keys may be used, for example, to log onto computer networks, or to access data subject to DRM (digital rights management) or other forms of persistent protection. One application of such keys is to access data such as content items associated with an authorized domain. The authorized domain, may be for example, a DVB-CPCM authorized domain. Further embodiments of the present invention provide a Smart Networking Card (SNC) smart card that provides network connectivity, such as Bluetooth or 802.11(b) connectivity, to a media device. The network connectivity so provided can be used, for example, to distribute access keys to other media devices. Aspects of the present invention will now be described in more detail.

Key Distribution Card

Figure 1:
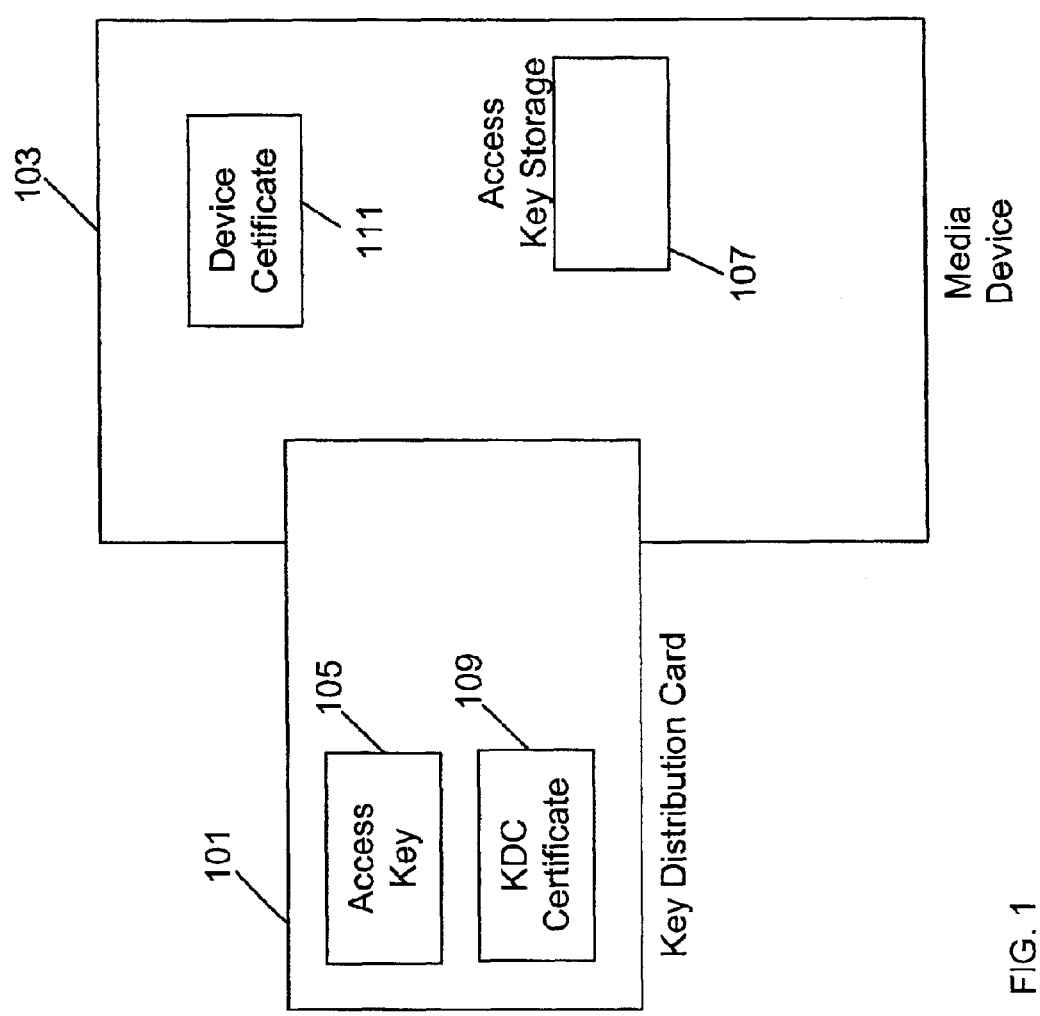
FIG. 1 shows an exemplary embodiment wherein a key distribution card is placed into a media device wishing to receive an access key.

In FIG. 1 is shown the KDC with reference number 101, having an access key 105 and a digital certificate 109 stored thereon. The KDC is shown in FIG. 1 as inserted into a media device 103 having a device certificate 111 and a store 107 for access keys. According to embodiments of the present invention, the KDC 101 may be implemented as a smart card that holds one or more similar or dissimilar access keys 105, and acts to distribute these keys to media devices. In certain embodiments, distributing an access key to a media device might involve the insertion of the KDC into a card reader device that is integrated with, or a peripheral of, the media device. Other embodiments allow a media device with no integrated or peripheral card reader to receive an access key by, for instance, by placing the KDC into a second media device that does have an integrated or peripheral card reader, and having the first media device connect to the second media device via a network or other data connection.

The KDC may be for example, an ISO-7816 compliant microprocessor card smart card having components such as a processor, ROM (Read-Only Memory), EEPROM (Electrically Erasable Programmable Read-Only Memory), and RAM (Random-Access Memory). The smart card may further be Java Card compliant. Placed into the KDC's EEPROM and/or ROM may be code for, in ways that will be described in more detail below, managing and distributing access keys stored thereupon. Also stored in the KDC's EEPROM and/or ROM may be one or more access keys for distribution. The access keys may be loaded upon the KDC by a trusted party such as a content provider, system administrator, or entity responsible for managing authorized domains. Accordingly, a user wishing to establish an authorized domain in her home might visit and/or contact a trusted party who could create an access key that could be used by media devices to access content in the authorized domain. The domain could, for example, be one in which all data stored and/or used therein would be subject to persistent protection, with the access key being necessary to access the content. The data could include music, video, software, documents, and the like. In certain embodiments, the persistent protection employed could be that of InterTrust Technologies of Santa Clara, Calif.

After creating the access key, the trusted party could prepare a KDC that the user could employ to distribute this access key. For example, the trusted party could use an appropriate device to load the access key onto, for example, the EEPROM of the KDC. The access key would preferably be stored in an encrypted or otherwise protected format. The trusted party might additionally instruct the KDC as to how many media devices it could dispense the access key to. The allowed maximum number of media devices to which the KDC may distribute the access key could be stored on the KDC.

Once in possession of the card, the user could employ it to distribute the key to media devices that she wished to be part of the domain. For each such media device that had an integral or peripheral smart card interface (103), shown in FIG. 1, the user could place the KDC in the interface. Upon sensing the KDC in its smart card interface, the device could query its user as to whether it was desired that the device receive an access key from the KDC. The query could be presented, for example, as a GUI (Graphical User Interface) dialog box that provided buttons for "yes" and "no". Alternately, the query might be presented via voice synthesis, and the user's vocal response could be interpreted via voice recognition.

If the user responded in the negative (e.g., by pressing the "no" button), the key distribution process could end and the user could be instructed to remove the card from the device. If, on the other hand, the user answered in the affirmative (e.g., by pressing the "yes" button), the process could continue. As a first step after the user answering in the affirmative, the KDC and the device could each perform operations to ensure that the other was compliant with a predetermined standard for content protection, and was respecting intellectual property laws and/or restrictions. Such laws and/or restrictions could include specifications dealing with the circumstances under which copying of content should or should not be allowed. For example, steps could be taken to ensure DVB-CPCM (Digital Video Broadcast Content Protection and Copy management) compliance.

The operations could, depending on the embodiment, be performed in a number of ways. For example, the KDC and media device could each maintain in an associated and/or integrated storage location a digital certificate (109, 111) that proved compliance with the predetermined standard. Each digital certificate could bear the digital signature of a trusted certificate issuing authority that could be trusted, for example, to issue certificates to only devices, KDC's, and the like that were compliant with the predetermined standard. Each of the KDC and media device could take steps, using techniques known in the art, to inspect the other's certificate.

In the case where one of the KDC and the media device was not satisfied with the other's compliance with the predetermined standard, the key distribution process could terminate. In the case where both were satisfied, the distribution process could continue. It is noted that, in some embodiments, no steps would be taken to ensure compliance with a predetermined standard for content protection, and/or respecting intellectual property laws and/or restrictions.

In certain embodiments of the invention, media devices store received access keys in a secure manner. In some cases, a media device could receive an access key in an unencrypted format from a KDC and then store it, in an encrypted manner, in an associated storage location 107, shown in FIG. 1. Alternately, a media device might receive an access key from a KDC in an encrypted format and store this encrypted key in an associated store 107 as shown in FIG. 1. In embodiments such as these, public key-private key encryption could be employed. Accordingly, a media device could pass its public key to a KDC. Upon receipt, the KDC could perform any decryption necessary to retrieve the access key located on its store. Next, the KDC could transmit to the media device a copy of the access key encrypted using the received public key.

Upon reception of the encrypted key, the media device could place it in an associated store. The key would be stored in the media device in a secure manner because it could only be effectively accessed by applying the device's private key, a key that the device and/or its user would keep secret. In certain embodiments, the device might act, upon receipt of the key, to ensure that it was received successfully. This could be implemented, for example, by employing a checksum technique wherein the device computed a checksum associated with the received encrypted key and compared the computed value to an expected value provided by the KDC. Based on the comparison, the media device could report success or failure to the KDC. In the case where failure was reported, the KDC could attempt to retransmit the encrypted key to the device. Once in possession of the access key, the media device could employ it to access the appropriate authorized domain, network, or the like.

As alluded to above, in certain embodiments of the invention, the KDC maintains a deployment counter that specifies how many more copies of a particular access key it is permitted to distribute to media devices. In one embodiment of the invention the initial value for the deployment counter is set by the trusted party, when the KDC is created. Further, in another embodiment of the invention, for every access key a separate deployment counter can be maintained and the corresponding initial values may be stored on the KDC. When the allowed number of the copies of the access key or keys is restricted, a check on the counter value can be made each time before a copy is distributed to a media device in order to keep the number of copies of the access keys within the allowed limit or limits. If the number of allowed copies has been used up, the user may be informed of that fact (for example via the GUI), and the key distribution process could be terminated. Accordingly, upon receiving a report that a media device has successfully received a transmitted access key, or upon transmission of the key in embodiments where not such check is performed, the KDC could decrement its deployment counter.

In some embodiments, the KDC might be able to effectively take back an access key from a media device by, for example, having the key deleted from the device. In such embodiments, the KDC could increment its counter upon its being satisfied that the access key has been successfully deleted. Proof of successful deletion might include, for example, having the media device transmit a memory dump to the KDC that shows that the area where the key had been stored has been irreversibly erased or overwritten. Irreversible erasure could be performed, for example, by filling with zero bits or random bits the storage area that had formally held the access key.

In certain embodiments a media device may be able to maintain more than one access key so as to be able to access more than one authorized domain, network, or the like. Such functionality may be useful, for example, if two individuals, each having an authorized domain, network, or the like, for example get married such that both domains or networks and associated data, as well as all of the associated media devices, become jointly-owned. In such a situation it might be desirable to have each of the media devices be able to access both of the domains or networks. To achieve this, each device could be made to have access keys corresponding to each of the two domains or networks.

Such functionality may also be useful in the case where two or more content providers have restrictions and/or requirements regarding the use of their content that differ to the point that a user must establish a different authorized domain or the like for each provider. In such a situation, it could be desirable for each of the user's media devices to belong to all of the domains or the like so established.

In some embodiments, a particular KDC might be capable of distributing copies of only a single access key. In such embodiments, distributing an additional access key to a media device already having at least one access key could involve performing the above-described steps with respect to the KDC that held a desired access key. In other embodiments, KDC's might be capable of distributing more than one particular access key each. In such embodiments, a KDC inserted in a media device could inform the media device of different available access keys. The media device could present the received choices to the user via, for example a GUI. The user could then make her selection, and the media device could inform the KDC of the user's choice. In response, the KDC could perform steps similar to those described above, forwarding each selected access key to the media device.

Figure 2:
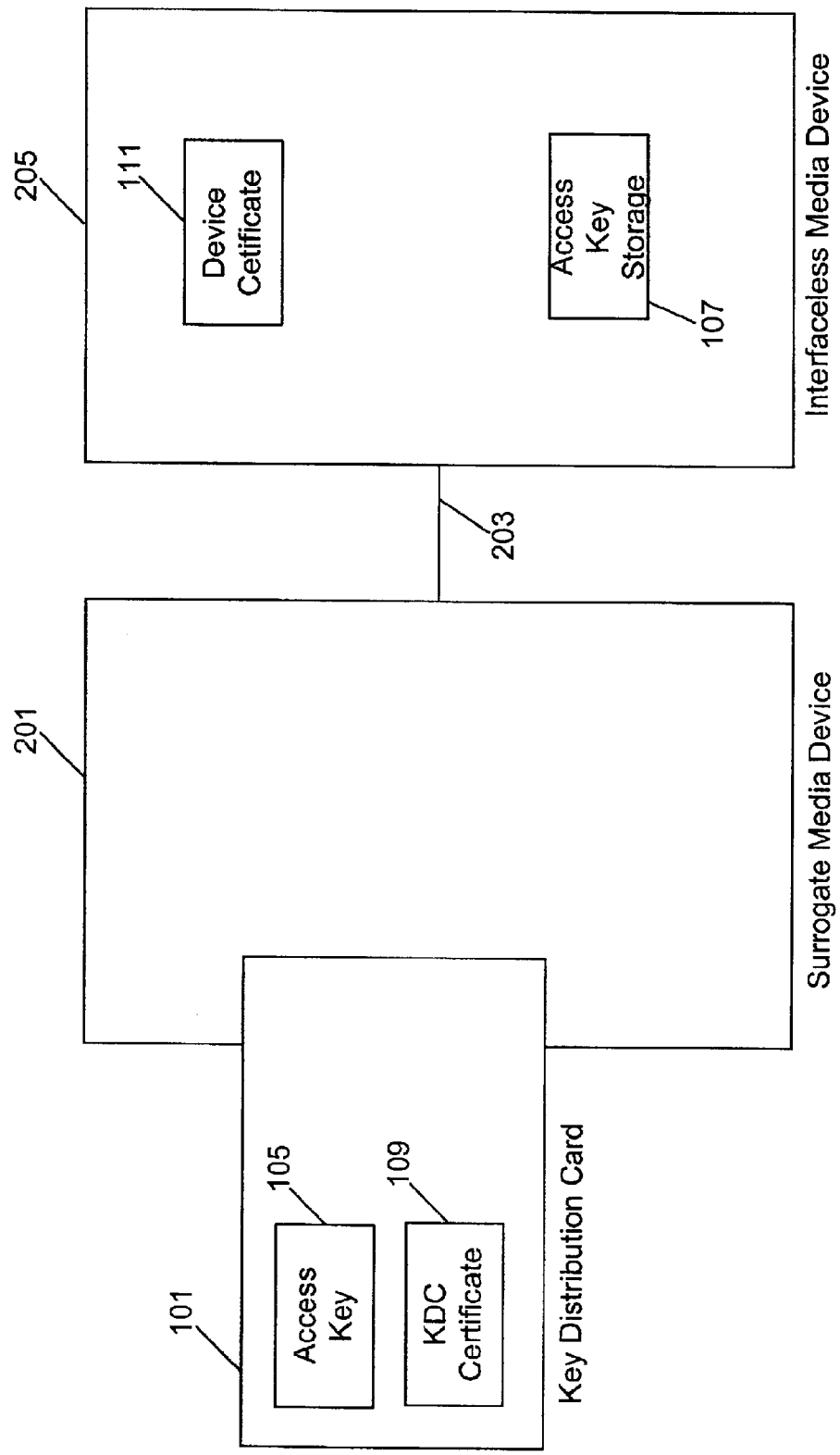
FIG. 2 shows an exemplary embodiment wherein a key distribution card is placed into a media device acting as a surrogate for a media device wishing to receive an access key.

As alluded to above, in the case where it is desired to distribute an access key to a media device without a smart card interface (205) as shown in FIG. 2, the appropriate KDC may be placed into a media device with a smart card interface. In FIG. 2 is shown the KDC 101 inserted into a "surrogate" media device 201 having a smart card interface and having a connection 203 to the media device 205 without a smart card interface. A media device with a smart card interface, acting in this capacity, may be referred to as a "surrogate" media device (201) as shown in FIG. 2. In such embodiments, a user could, perhaps via a GUI, inform a media device without a smart card interface that she wished for the device to receive an access key from a KDC via a surrogate media device. In response, the interfaceless media device could ask the user to select, perhaps from a GUI-provided selection list, the surrogate media device whose smart card interface would be used. The selection list could be populated in a number of ways.

For example, the interfaceless device could scan the networks to which it was connected for media devices capable of acting as surrogates. In certain embodiments, media devices capable of and/or willing to act as surrogates might respond to queries on made on a certain port asking for responses from all devices capable of and/or willing to act as surrogates. Accordingly, scanning the network might entail having the interfaceless device send out over a network to which it is connected one or more UDP (User Datagram Protocol) packets, directed to media devices listening on a certain port, asking for a response from each device capable of and/or willing to act as a surrogate. A response could include, for example, the IP address or other network identifier of the responding device. It is noted that in certain embodiments scanning would not occur. Instead, for example, the user operating the interfaceless device might be asked to enter the IP address or similar network identifier of the desired surrogate device.

After receiving the user's selection, the interfaceless device could instruct the user to place the appropriate KDC into the smart card interface of the surrogate device. The user might further be required to answer a dialog box or the like on the selected surrogate device providing permission for that device to act as a surrogate. Once the KDC was placed in the surrogate device, and any permission dialogs were answered affirmatively, the key distribution process between the KDC and the interfaceless media device could proceed in a manner similar to that described above, but with the surrogate device acting as a communications thoroughfare. Accordingly, for example, the KDC's request for the interfaceless device's public key could be received at the surrogate device and passed' to the interfaceless device over a network connecting the two (203). The network can be wired or wireless depending on the capabilities of the interfaceless media device and the surrogate device. In wireless communication embodiments, the devices could communicate, for example, using Bluetooth or IEEE 802.11 (b) communication protocols. The public key could be passed from the interfaceless device to the surrogate device, which would in turn forward it to the KDC. Communicating between the interfaceless device and the surrogate device could be implemented, for example, using SOAP (Simple Object Access Protocol), RMI (Remote Method Invocation), or JMS (Java Messaging Service).

Smart Networking Card

As noted above, embodiments of the present invention provide a Smart Networking Card (SNC) that provides wireless network connectivity to a device by way of a specialized smart card. This is advantageous in embodiments where the device, as manufactured and/or presented to its user, does not initially include an interface for wireless networking. According to certain embodiments, the SNC connects to a media device via only a standard (e.g., ISO-7816) smart card interface. In certain embodiments, the SNC may employ a specialized high-speed interface.

Figure 3:
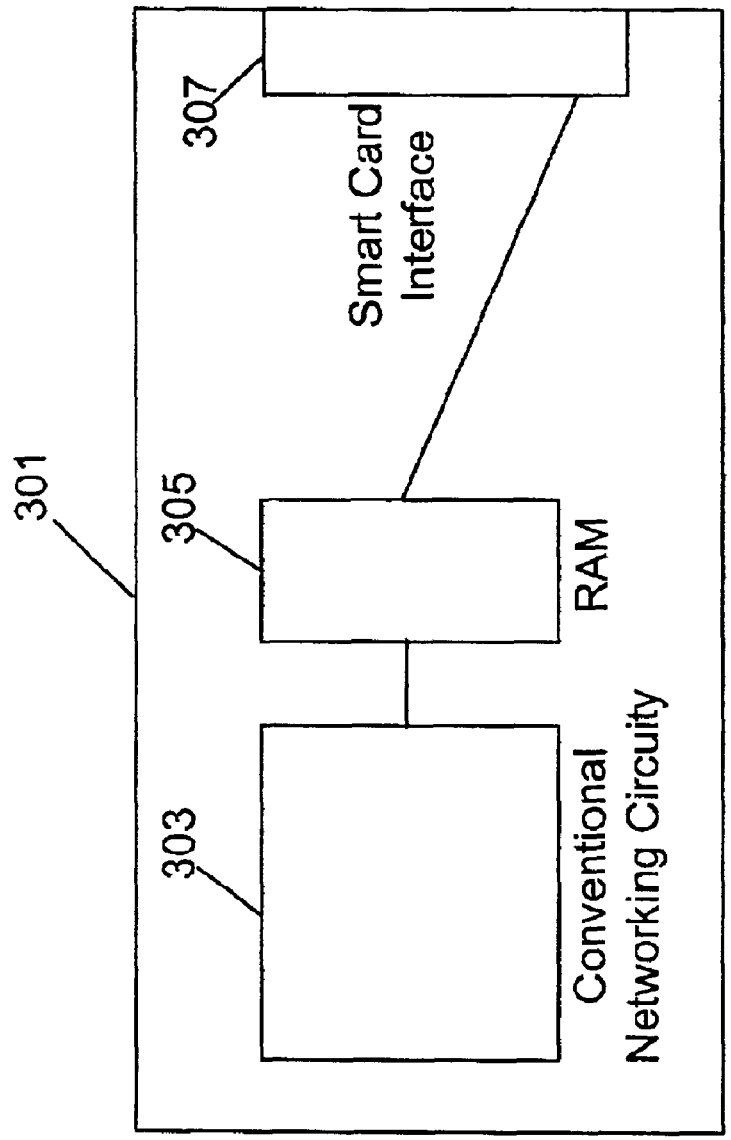
FIG. 3 shows an exemplary smart networking card according to embodiments of the present invention.

As is known in the art, two main types of smart cards are memory cards and microprocessor cards. According to one implementation, the SNC's design could be based on a smart card memory card. More specifically, as is illustrated in FIG. 3, the SNC could be implemented as a custom memory card smart card (301) including random access memory (305) accessible in the manner typical of smart card memory cards, and further including conventional networking circuitry (303) configured so as to also have access to the random access memory (305). In FIG. 3 is also shown a smart card interface 307. The conventional networking circuitry could be, for example, Bluetooth or IEEE 802.11 (b) circuitry available to OEMs (original equipment manufacturers) for use in PCMCIA or PCI network cards. The RAM may be physically and/or logically split into one or more divisions. According to some embodiments, the divisions may include a data-in buffer, a data-out buffer, a command-in buffer, and a command-out buffer.

In such an embodiment a media device having the SNC card inserted into a proper slot, and wishing to send data using the SNC's network circuitry, could place that data in the data-out buffer. This operation could be performed by the media device in a conventional manner used to write to a particular memory location of a standard memory card smart card (e.g., as specified by ISO-7816). In certain embodiments, a media device wishing to send data might also need to place in the command-in buffer one or more appropriate commands relating to data transmission. As above, the placement of the command in the buffer could be performed in a conventional manner used to write to a particular memory location of a standard memory card smart card. The command could be one consistent with the conventional networking circuitry's command and/or instruction set, as specified by its designer and/or manufacturer.

A send command, for example, could include an indication of one or more corresponding intended recipients. The conventional networking circuitry could be configured to look in the data-out buffer for data to be sent over the wireless network, and perhaps further configured to look in the command-in buffer for commands to execute. The conventional networking circuitry could be additionally configured to receive from the wireless network data directed towards the media device, and to place that data in the data-in buffer. The networking circuitry could additionally be configured to place in the command-out buffer any administrative messages, such as error messages, that it wishes to send to the media device. The media device, in turn, could access the data-in buffer when it wished to access data received over the network. The media device could additionally access the command-out buffer when it wished to check for errors or other messages received form the networking circuitry.

Various techniques could be employed to manage the buffers. For example, data elements could be cleared from a buffer after they are read from it. For instance, after a certain chunk of data is read from the data-in buffer by a media device, that data could be deleted from the buffer. In other embodiments, the buffers could be cleared periodically. In some embodiments, both techniques could be applied.

In certain embodiments of the invention, the operations described above as being performed by a media device could be performed by way of driver software running on the device. The driver software could, in one aspect, interface with the device's operating system (OS) so as to have the OS view the SNC as a standard network interface. In a second aspect, the driver software could act to write to and read from the buffers as described above.

For example, an application running on a media device and wishing to send a certain piece of data over the network via the SNC could make an appropriate call using a standard networking API. The OS could, in responding to the call, communicate with the driver. The driver could, in turn, pass the piece of data over the smart card interface (307), shown in FIG. 3, and into the SNC's data-out buffer, perhaps additionally placing an appropriate command in the command-in buffer.

Although four buffer divisions have been described herein, it is noted that, in certain embodiments, some of these divisions may be combined. For example, the data-in and command-in buffers could comprise one single division while the data-out and command-out buffers could comprise a second single division.

Figure 4:
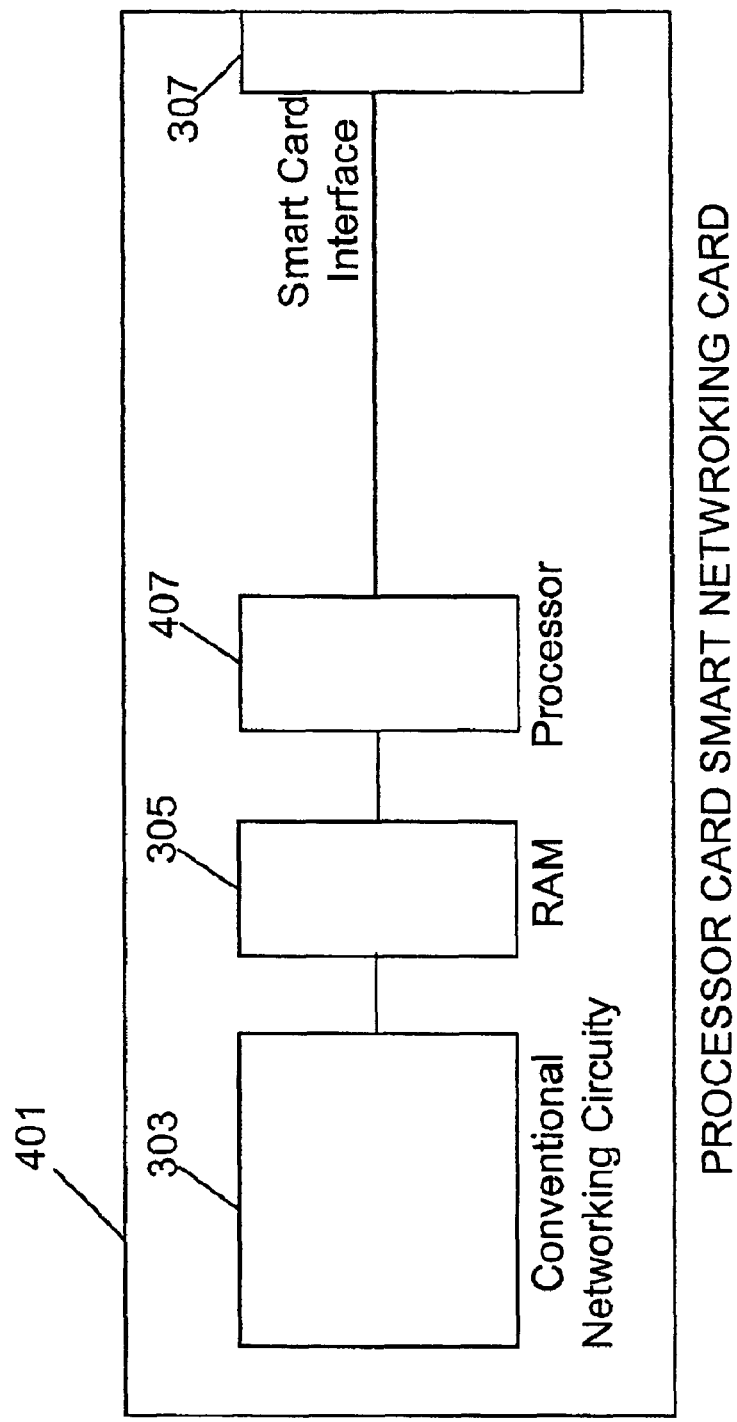
FIG. 4 shows an exemplary smart networking card according to further embodiments of the present invention.

Furthermore, although implementation has been described with respect to a memory card smart card, as is illustrated in FIG. 4 a SNC could also be implemented using a design based on a microprocessor card smart card. In FIG. 4 the microprocessor smart card is referenced with number 401, the conventional networking circuitry with number 303, the RAM memory with number 305, the microprocessor with number 407, and the smart card interface with reference number 307. Such embodiments could employ RAM accessible both by the SNC's networking circuitry and the SNC's microprocessor (407). The RAM could be split into one or more buffer divisions as described above. However, instead of having a media device write directly to or read directly from these buffers, the media device could instead communicate with the SNC's processor in order to transmit data over the network or access data received over the network.

For example, a media device wishing to send data over the wireless network could pass the data over the smart card interface to the SNC's microprocessor, perhaps including an indication and/or instruction describing what to do with the data. It is noted that this command would not need to be in a form directly understandable by the networking circuitry. The microprocessor card-based SNC could, in turn, act in a manner analogous to that described above with reference to a SNC based on a memory card smart card, placing the data in a data-out buffer accessible by the networking circuitry, and perhaps placing an appropriate command in a command-in buffer accessible by the networking circuitry.

As another example, the microprocessor card-based SNC's network circuitry, upon receiving data from the network directed to the media terminal, could place this data in a data-in buffer. The SNC's microprocessor could periodically check this buffer for data. Alternately, the network circuitry could inform the microprocessor whenever it places data in the data-in buffer. In either case, the SNC's microprocessor could act to retrieve the data from the buffer and transfer it to the media device over the smart card interface. Upon transmitting the data, the microprocessor might act to delete that data from the buffer. As above, running on the media device could be driver code for performing the operations described above regarding media device communication with the SNC. Furthermore, included on the microprocessor card-based SNC could be ROM, EEPROM, or the like containing code for the SNC's microprocessor to follow in order to perform the above-referenced wireless networking operations.

The above-described embodiments use standard smart card interface circuitry to provide a connection between a SNC and a media device. However, many such standard interfaces are limited in speed. For example, certain standard smart card interfaces are currently incapable of reaching speeds in excess of 115 kbit/s. Accordingly, certain embodiments of the invention may additionally include high-speed interface circuitry, in communication with the networking circuitry, that can be employed provide a faster connection between the SNC and a media device. The high-speed interface circuitry may be implemented in a number of ways. For example, in certain embodiments the circuitry could act to provide a USB interface where the SNC takes on a client/peripheral role. In other embodiments, the circuitry could operate according to the HDLC (High-Level Data Link Control) protocol as specified in ISO 3309. Chipsets providing said circuitry are available for purchase, and can be employed to act in the manner described above.

The high-speed circuitry, in order to communicate with a media device, will likely require one or more communication lines between itself and the device. For example, when the high-speed circuitry is ISO 3309 circuitry, three communication lines may be required: high-speed data in, high-speed data out, and high speed clock. In Certain embodiments, such communications lines may be placed in a SNC's standard smart card interface.

For example, the ISO 7816 standard specifies a smart card interface having the following eight connections:

1 VCC (supply voltage)
2 RST (reset signal)
3 CLK (clock signal)
4 Reserved for Future Use
5 GND (ground)
6 VPP (programming voltage)
7 I/O (data input/output)
8 Reserved for Future Use According to embodiments of the invention, when placing within a SNC's standard smart card interface the communication lines of a high-speed interface implemented as specified in ISO 3309, connection 4 could be used for the high-speed data in line, connection 6 could be used for the high-speed clock line, and connection 8 could be used for the high-speed data out line. In the case where the high-speed interface is implemented as a USB interface, connection 4 could be used for data in, and connection 8 could be sued for data out.

It is noted that connections 4 and 8 are "Reserved for Future Use" in the ISO 7816 standard and are therefore not used in general smart card interfacing operations. Similarly, as connection 6 is only used in smart card programming, this connection is also not used in general smart card interfacing operations. Accordingly, it is the case that using a smart card interface's connection in this way has the advantage of not impeding the interfaces ability to perform general smart card interfacing operations.

For embodiments that place within a SNC's standard smart card interface the communication lines of a high-speed interface, a media device intended to make use 'the high-speed interface could need to have a smart card interface with the ability make use of these high-speed communication lines.' For example, a media device's smart card interface might need to recognize HDLC signals on connections 4, 6, and 8 as described above. Also running on the media device could be appropriate driver software to allow applications running on the device to receive network connectivity via the SNC via the high-speed interface.

It is noted, however, that embodiments of the SNC providing a smart card interface enhanced to carry high-speed signals also offer on that interface the earlier-described connectivity making use of standard smart card communications. Accordingly, SNC's of these embodiments might offer dual functionality by providing a high-speed interface to properly-equipped media devices, while providing the standard smart card communications interface to media devices equipped with only a standard smart card interface.

In certain embodiments, media devices capable of accessing the higher-speed interface could opt to use the standard smart card communications interface instead. Thus a media device's user might specify, using a GUI control panel or the like, the interface she wished the device to employ. In certain embodiments, a media device might preferentially make use of the high-speed interface but switch to the standard smart card communications interface in the case of operational or other difficulties with the high-speed interface.

In the above-described embodiments, the high-speed communications lines used connectors of a standard smart card interface. In other embodiments, an SNC might instead include an additional dedicated interface to carry these lines. The additional interface might include, for example, a edge connector providing a number of contacts, wherein one is used for HDLC high-speed data in, a second is used for HDLC high-speed data out, and a third is used for HDLC high-speed clock. A media device intended to make use of such a high-speed interface might need to have an interface and appropriate circuitry coupleable to it. Also running on the device could be appropriate driver software to allow applications running on the device to receive network connectivity from an SNC via the dedicated connector. In a manner analogous to that described above, an SNC providing the above-described dedicated interface could offer dual functionality by using the dedicated interface to provide the high-speed connectivity to properly-equipped media devices, while providing standard smart card connectivity to media devices equipped with only a standard smart card interface.

Hardware and Software

Certain aspects of the present invention may be executed by or with the help of a computer. The phrases "general purpose computer," "computer," and the like, as used herein, refer but are not limited to a processor card smart card, media device, personal computer, engineering workstation, PC, Macintosh, PDA, mobile terminal, server, network access point element and the like, perhaps running an operating system such as OS X, Linux, Darwin, Windows CE, Windows XP, Symbian OS, a proprietary smart card operating system, or the like, perhaps with support for Java. For example, an above-described processor card smart card could host the Java Card Runtime Environment (JCRE), and thus be able to run Java software modules employing the Java Card API.

Figure 5:
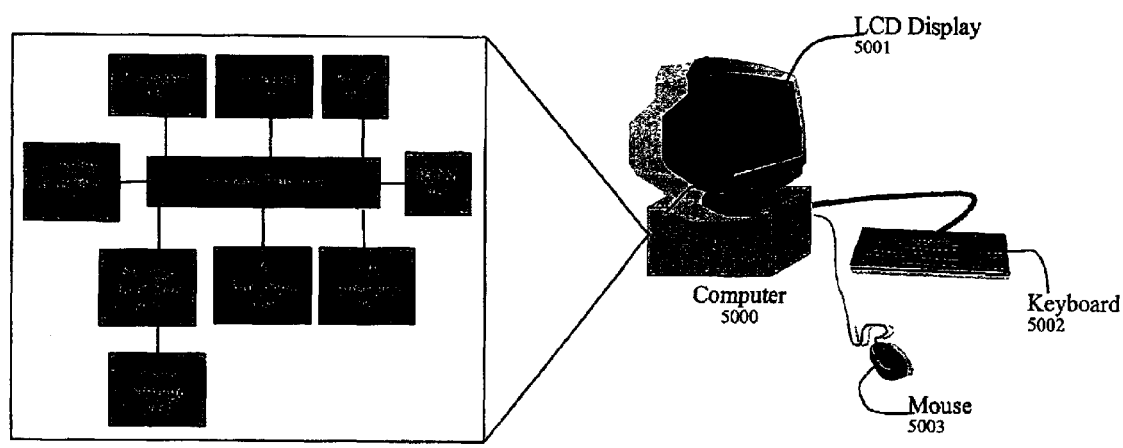
FIG. 5 shows an exemplary general purpose computer involved with certain embodiments of the present invention.

The phrases "general purpose computer," "computer," and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 5000 as shown in FIG. 5 includes system bus 5050 which operatively connects two processors 5051 and 5052, random access memory (RAM) 5053, read-only memory (ROM) 5055, input output (I/O) interfaces 5057 and 5058, storage interface 5059, and display interface 5061. Storage interface 5059 in turn connects to mass storage 5063. Each of I/O interfaces 5057 and 5058 may be an Ethernet, IEEE 1394, IEEE 802.11, or other interface such as is known in the art. Mass storage 5063 may be a hard drive, optical disk, or the like. Processors 5051 and 5052 may each be a commonly known processor such as an IBM or Motorola PowerPC, an Intel StrongARM, or an Intel Pentium. Computer 5000 as shown in this example also includes an LCD display unit 5001, a keyboard 5002 and a mouse 5003. In alternate embodiments, keyboard 5002 and/or mouse 6003 might be replaced with a pen interface. Computer 5000 may additionally include or be attached to card readers, DVD drives, or floppy disk drives whereby media containing program code may be inserted for the purpose of loading the code onto the computer.

In accordance with the present invention, a computer, such as a processor card smart card or media device may run one or more of the software modules designed to perform one or more of the above-described operations, the modules being programmed using a language such as Java, Objective C, C, C#, or C++ according to methods known in the art.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

For example, in the previous description of various embodiments, reference was made to the accompanying drawings that showed by way of illustration various embodiments in which the invention may be practiced. It is to be understood that other embodiments may be utilized, and structural and functional modifications may be made, without departing from the scope of the present invention.

What is claimed is:

1. A method for distributing access keys to one or more media devices, comprising:

selecting a media device;

selecting an access key stored on a smart card;

determining the conditions for distribution of the selected access key from said smart card to the selected media device, and if the conditions are met:

receiving at said smart card a public key relating to the selected media device;

having said smart card create an encrypted copy of the selected access key, the encryption being performed according to said public key;

having said smart card dispatch said encrypted copy to the selected media device; and having said smart card decrement an incorporated counter, the value of said counter specifying how many more copies of the selected access key the smart card is permitted to distribute, wherein the smart card is capable of distributing more than one copy of the selected access key.

2. The method of claim 1, wherein the selected access key allows the selected media device to access data within an authorized domain.

3. The method of claim 1, wherein an initial value for the counter associated with the selected access key is set in association with the storing of the selected access key.

4. The method of claim 1, wherein the conditions for the distribution of the selected key comprise:
the counter value indicating that a copy of the selected access key is permitted.

5. The method of claim 1, wherein the conditions for the distribution of the selected key comprise:
having said smart card determine the selected media device's compliance with a predetermined standard for content protection; and
having the selected media device determine said smart card's compliance with a predetermined standard for content protection.

6. The method of claim 5, wherein determining compliance involves examining a digital certificate.

7. The method of claim 1, wherein media device selection is performed by inserting the smart card into a smart card interface of the selected media device.

8. The method of claim 1, further comprising:
having said smart card maintain a second access key;
selecting said second access key;
determining the conditions for the distribution of the second access key to the selected media device; and if the conditions are met,
having said smart card create an encrypted copy of said second access key, the encryption being performed according to said public key;
having said smart card dispatch, to the selected media device, said encrypted copy of said second access key; and
having said smart card decrement a second counter associated with the second access key, the value of said second counter specifying how many more copies of said second access key the smart card is permitted to distribute.

9. The method of claim 1, wherein said smart card is inserted into a smart card interface of the selected media device.

10. The method of claim 1, wherein said smart card is inserted into a smart card interface of a second media device, said second media device being operatively connected to the selected media device.

11. A system for distributing access keys, comprising:
a smart card possessing a storage location having program code stored therein, said smart card further possessing a processor operatively connected to said storage location for carrying out instructions in accordance with said stored program code;
wherein said program code, when executed by said processor, causes said processor to perform the steps of:
maintaining at least one access key in a memory of said smart card;
enabling the selection of one of the access keys;
enabling the selection of a media device;
determining the conditions for the distribution of a selected access key from said smart card to a selected media device, and if the conditions are met:
receiving a public key relating to the selected media device;
creating an encrypted copy of the selected access key, the encryption being performed according to said public key;
dispatching said encrypted copy to the selected media device; and
decrementing a counter incorporated within the smart card and associated with the selected access key, the value of said counter specifying how many more copies of the selected access key the smart card is permitted to distribute, wherein the smart card is capable of distributing more than one copy of the selected access key.

12. The system of claim 11, wherein the selected access key allows the selected media device to access data within an authorized domain.

13. The system of claim 11, wherein an initial value for the counter associated with the selected access key is set in association with the storing of the selected access key.

14. The system of claim 11, wherein the conditions for the distribution of the selected access key involves examining that the counter value associated with the selected key permits creation of the encrypted copy of the selected key.

15. The system of claim 11, wherein said program code, when executed by said processor, further causes said processor to perform the step of:
determining the selected media device's compliance with a predetermined standard for content protection.

16. The system of claim 15, wherein determining compliance involves examining a digital certificate.

17. The system of claim 11, wherein said program code, when executed by said processor, further causes said processor to perform the steps of:
maintaining a second access key in said memory;
enabling the selection of said second access key;
determining the conditions for the distribution of the second access key to the selected media device, and if the conditions are met;
creating an encrypted copy of said second access key, the encryption being performed according to said public key;
dispatching, to the selected media device, said encrypted copy of said second access key; and
decrementing a counter associated with the second access key, the value of said counter specifying how many more copies of said second access key the smart card is permitted to distribute.

18. The system of claim 11, wherein said smart card is inserted into a smart card interface of the selected media device.

19. The system of claim 11, wherein said smart card is inserted into a smart card interface of a second media device, said second media device being operatively connected to the selected media device.

* * * * *